INVENTOR
EIBE A. WILCKENS

BY *Cushman, Darby & Cushman*
ATTORNEYS

Jan. 2, 1962 E. A. WILCKENS 3,015,388
CAP INSPECTION APPARATUS
Filed May 25, 1959 5 Sheets-Sheet 5

INVENTOR
EIBE A. WILCKENS

BY Cushman, Darby & Cushman
ATTORNEYS

United States Patent Office 3,015,388
Patented Jan. 2, 1962

3,015,388
CAP INSPECTION APPARATUS
Eibe A. Wilckens, Baltimore, Md., assignor to Crown Cork & Seal Company, Inc., Philadelphia, Pa., a corporation of New York
Filed May 25, 1959, Ser. No. 815,587
26 Claims. (Cl. 209—75)

The present invention relates to a cap inspection apparatus and, more particularly, to an apparatus for quality inspection of caps of the type having a shell with a depending skirt and a cushion liner therein.

In the present-day manufacture of caps, many various machines are used to gather cap parts, such as the metal shells, cork or plastic liners and metal foil spots or disks, and assemble them as a unit. Such machines may either handle the cap parts in a step-by-step movement or continuously, and usually the liners are inserted into and adhered to the shells and then the spot or disk is adhered to the liners. A typical cap assembling apparatus which continuously handles the cap parts and thereby achieves an optimum output of finished caps is disclosed in the prior United States Patent No. 2,703,130, issued March 1, 1955, to Eibe A. Wilckens and Harry A. Rau. While the present invention is intended for use with such a cap assembling apparatus of the type disclosed in the aforementioned patent, it will be quite evident that other types of cap assembling apparatus may be used, it merely being desirable to have the cap assembling machine in the vicinity of the machine of the present invention so that the finished caps may be fed directly thereto.

Heretofore, after the caps have been assembled, they have been fed from the cap assembling machine down a chute onto a moving endless conveyor structure, the caps being so oriented that the cap shell is inverted and the liner inserted in the cap is visible. Along each side of the moving conveyor are positioned inspectors who continuously watch the flow of caps to determine if the caps are provided with a liner or are mutilated or defective in any manner. Of course, such an inspection eliminates a certain amount of defective caps but the quality of such inspection is determined by the ability of the individual inspector observing the flow of caps. Oftentimes it is possible for the inspectors to miss a cap having a bad liner which will not properly seal with a container, or even miss a cap in the flow of caps where the liner is absent from the shell. Such visual inspection of caps by inspectors cannot distinguish caps having improper outside and inside diameter of the caps, as the eye of the inspector is not capable of perceiving errors in this area. It is important that the outside and inside diameter of the caps be properly controlled within specified limits as errors in this area would cause improper capping of a container or even jamming of the capping apparatus.

As mentioned above, it is often difficult for an inspector watching a continuous flow of caps to actually perceive whether a cap has a liner or not. In recent years and in the development of the crown type of caps for bottles and other containers, the shell of the caps have been provided with a cork cushion liner that is adhered to the shell by an adhesive, such as glue or the like and, in addition, a metal foil spot or disk is provided on the liner so that the contents of the container being packaged will not attack the granulated cork or the filler which causes the cork to stick together. By adhering a metal foil disk on the liner it has become increasingly difficult for the inspectors to distinguish whether a liner is in a shell when there is a continuous flow of a number of caps past the inspection station. Such a condition has required that there be an increased number of inspectors viewing the same flow of caps so as to minimize the error of visual inspection and rejection of caps.

An object of the present invention is to provide an apparatus for quality inspection of finished caps, the apparatus rejecting all caps having functional defects.

Another object of the present invention is to provide a cap inspection apparatus which will automatically inspect a cap to determine if the cap includes all of its necessary cap parts.

Another object of the present invention is to provide a cap inspection apparatus which will accurately determine the presence or absence of a liner in a cap shell.

Still another object of the present invention is to provide an apparatus which will determine, in a highly efficient manner, whether the liner provided in a cap shell has the proper sealing surface for sealing with the lip of a container.

A further object of the present invention is to provide an apparatus which will determine whether a liner provided in a cap shell is properly adhered to the cap shell within existing standards required during bottling.

A still further object of the present invention is the provision of a cap inspection apparatus which will accurately gauge the internal diameter of the shell of a cap and if the diameter does not fall within certain predetermined standards then the cap is rejected and ejected from the apparatus.

An additional object of the present invention is to provide a cap inspection apparatus capable of gauging the outside diameter of the cap shell to ascertain if the diameter falls within predetermined limits and if the diameter does not fall within such limits then reject the cap and eject it from the apparatus.

Still a further object of the present invention is to provide a mechanism which will accurately inspect a cap for various quality control measures, such inspection being accomplished at a rapid rate of speed whereby caps as they are received from a cap assembling machine may be continuously inspected and transferred for packaging.

A further object of the present invention is to provide a cap inspecting apparatus which is completely automatic for quality inspection of caps and which will continuously inspect caps delivered to it and reject those caps having functional defects, the apparatus being so designed that the inspection is positive and controlled within predetermined desirable limits.

While the cap inspection machine of the present invention will be described as inspecting caps of the crown type having a shell with a depending flange and a liner inserted therein, it of course will be understood that the apparatus is capable of inspecting any type of cap having a shell and a liner, such as a threaded cap, lug cap, side seal cap, or the like, without departing from the invention.

The above objects and advantages, as well as other objects and advantages of the invention, will be more apparent from the following specification, claims and drawings, wherein:

General construction and operation

Figure 6:
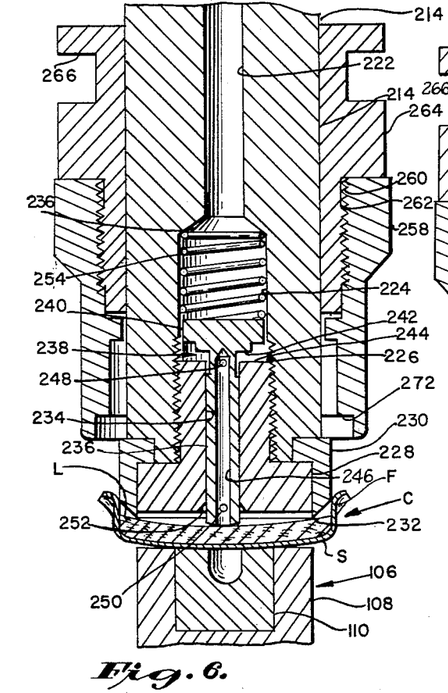
FIGURE 6 is an enlarged fragmentary sectional view of one of the testing heads of the rotary inspection structure and showing a cap supported on the platform of the transfer dial and being initially inspected.

The machine illustrated in the drawings is intended for automatic inspection of assembled crown-type bottle caps. As shown in FIGURE 6, such caps C generally comprise a metal shell S having a depending skirt or flange F and a liner L, the liner usually being formed of a cork disk. The liner L is usually held within the shell S by any suitable adhesive so that containers capped under pressure will not leak. Oftentimes a metal foil spot or disk is provided on the exposed surface of the liner, the metal foil disk being utilized where the contents of the container capped are such that they would attack or react with the cork liner and thus shorten the shelf life of a capped container.

Figure 1:
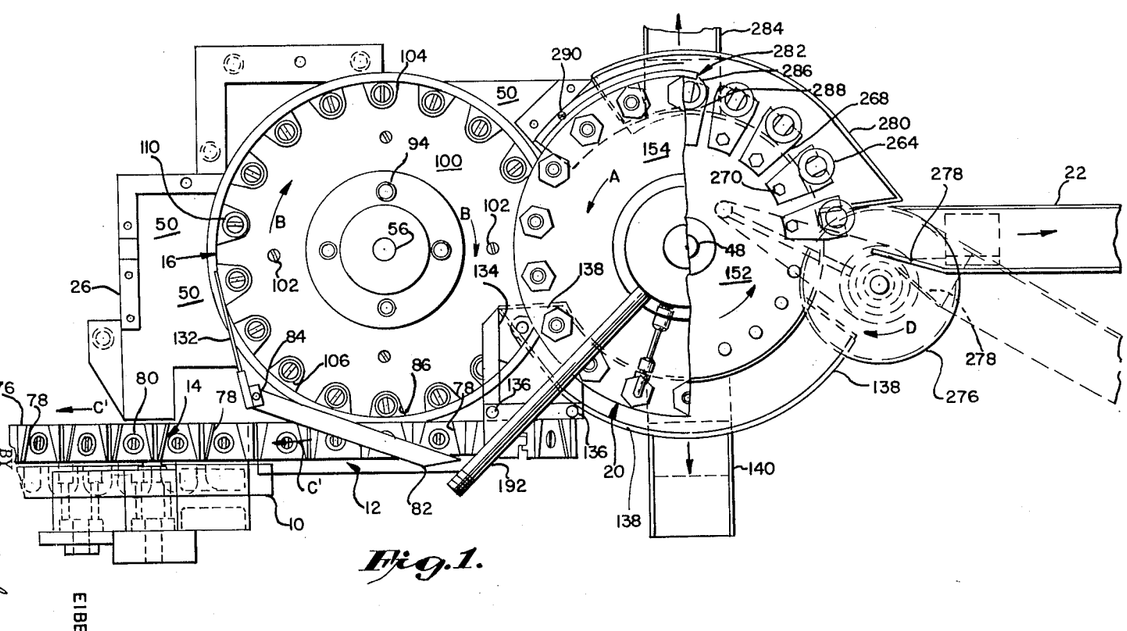
FIGURE 1 is a top plan view of the cap inspection machine of the present invention, with portions broken away so as to more clearly disclose the same.

The construction and operation of the embodiment of the present invention disclosed herein may be generally described as follows: As indicated in FIGURE 1 and in FIGURE 2, caps C are delivered to the inspection machine from a source, such as a cap-assembling machine of the aforementioned Wilckens et al. patent. The caps may be fed directly from a presser dial 10 shown in phantom lines of the cap assembly machine, to an endless conveyor mechanism 12 operating in timed relationship with each other. It will be noted that the caps C are fed from the presser dial 10, which is rotating in the direction of the arrow E, in such a manner that when they are positioned on the endless conveyor mechanism 12, they are supported on the shell upside down with the liner exposed. The endless conveyor mechanism 12 is provided with a plurality of cap-receiving pockets or recesses 14 which continuously pass the outlet of the chute 10, each pocket 14 receiving a single cap from the chute 10 and transferring the same in single file to a cap transfer and supporting dial, generally indicated at 16. The cap-supporting dial 16 is continuously rotating in timed relationship with the endless conveyor mechanism 12 and receives the properly faced caps therefrom and transfers them to a position beneath an inspection head 18 mounted on a rotary inspection structure or turret, generally indicated at 20. If the cap is not mutilated and has a good liner, it is transferred from the cap-supporting dial 16 to the inspection head 18 where it will remain until such time as subsequent inspection tests are made to ascertain if the cap meets the minimum standards required with regard to assembly of cap parts, proper dimensions and proper sealing characteristics.

The rotary inspection structure or turret 20 is provided with a plurality of the testing heads 18 and is so mounted to rotate on a vertical axis spaced from the vertical axis of the cap-supporting dial 16 that the heads, one by one, pass over caps traveling on the dial 16. When the caps approach a position where they will be under a testing head, they are elevated vertically into engagement with the testing head and a preliminary test is conducted to ascertain if the cap has (1) a liner L, (2) the liner L has a proper sealing surface, and (3) the shell S has the proper inside diameter. Should the cap be missing a liner L, it will remain on the transfer dial 16 and then will be stripped therefrom into a reject box. Likewise, if the cap has an inside diameter which is too small, the testing head 18 is so constructed that it will not pick off the cap, and thus the cap will remain with the transfer dial and be stripped therefrom into the reject box. If the liner L is properly positioned within the cap, but there is a defect in its sealing surface, again the testing head 18 will not pick off the cap, and the cap will remain on the dial 16 to be subsequently stripped therefrom into a reject pile. On the other hand, should the shell S of the cap have the proper inside diameter, and the liner is present within the shell but the liner has not been properly adhered to the shell and is loose therein, the shell S of that particular cap will remain on the transfer dial 16 to be subsequently ejected therefrom, whereas the liner L will remain with the testing head and will be ejected at a different station.

Assuming the cap C passes the preliminary tests of having a tight fitting liner, with a proper sealing surface, as well as a shell S having the proper inside diameter, then the testing head 18 will pick the cap C off of the transfer dial 16 and will transfer the cap to a position where a subsequent test is made to determine if the shell of the cap has the proper outside diameter. If the outside diameter is too large, because of mutilation or poor manufacture, the cap C is then positively ejected from the testing head 18 into a reject pan. In some instances, where the liner L has not been properly adhered to the shell S of the cap C, the cap, as a unit, will not be ejected at this position but only the shell will be ejected, the liner L being held by the testing head 18 to be subsequently ejected therefrom.

Figure 12:
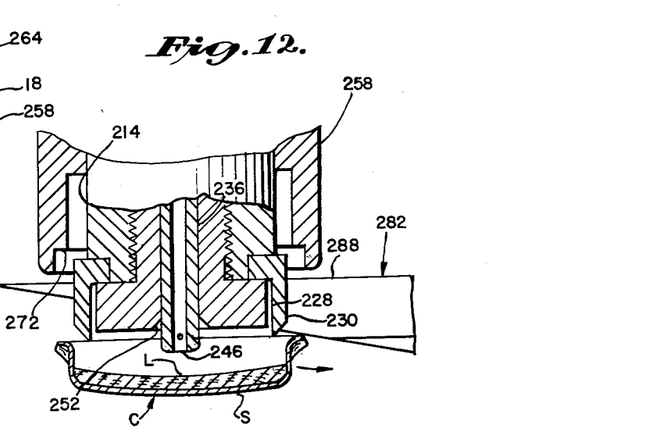
FIGURE 12 discloses the stripper blade extending into the path of liners or crown caps having functional defects and which must be stripped from the testing head.

After the cap has been tested and found to have a satisfactory outside diameter, the testing head 18 carries the cap to a position where it can be ejected as a good closure, suitable for application to a container. However, the testing head 18 is further arranged to check the liner L to see if it is properly adhered to the shells. If the liner L is tight fitting in the shell across its diameter but is not properly adhered to the shell, the cap is not discharged with the good caps, as the liner L will assume the position shown in FIGURE 10. This prevents the cap from dropping from the testing head 18. Such a cap C, having an improperly adhered liner, is subsequently stripped from the testing head 18, as shown in FIGURE 12.

The good caps are ejected off the testing heads in single file and pass down a chute 22 where they may be counted by a suitable cap-counter, such as an electric eye arrangement as disclosed in United States Patent No. 2,760,678, issued August 28, 1956, to Eibe A. Wilckens and Charles C. Stoll. The chute 22 may be so arranged as to move from one container to another after a predetermined number of caps C have passed an electric eye counter arrangement such as disclosed in the aforementioned Wilckens and Stoll patent, or may be arranged to oscillate so as to distribute the caps C onto a cooling belt (not shown).

The above general description of the inspection performed on crown-type caps by the cap inspection machine of the present invention will be more apparent from the following detailed description of the construction and operation of each of the various elements which make up the cap inspection machine.

Drive mechanism

Figures 2, 4, 5:
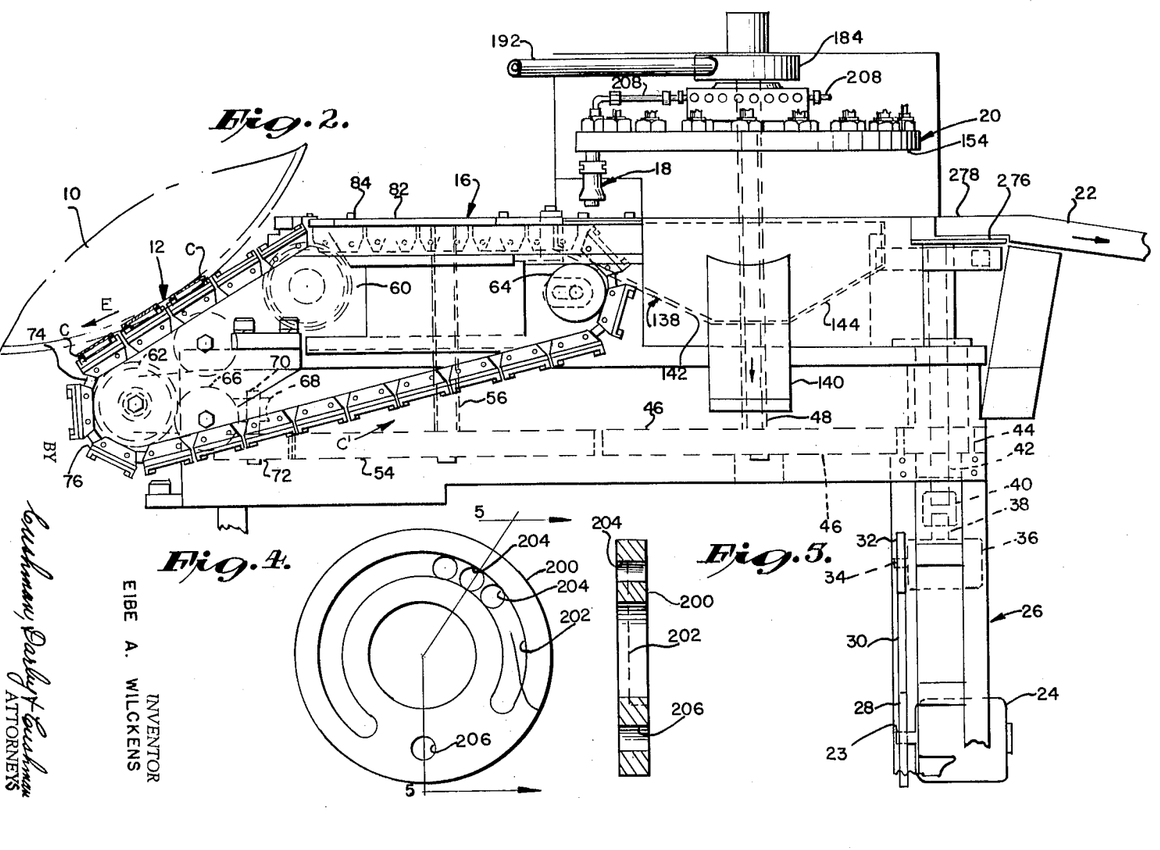
FIGURE 2 is a side elevational view of the machine in FIGURE 1.
FIGURE 4 is an enlarged plan view of the distributor disk of the distributor valve for distributing vacuum to the testing heads, as well as venting vacuum therefrom.
FIGURE 5 is a sectional view of the distributor valve disk taken on the line 5—5 of FIGURE 4.
Figure 3:
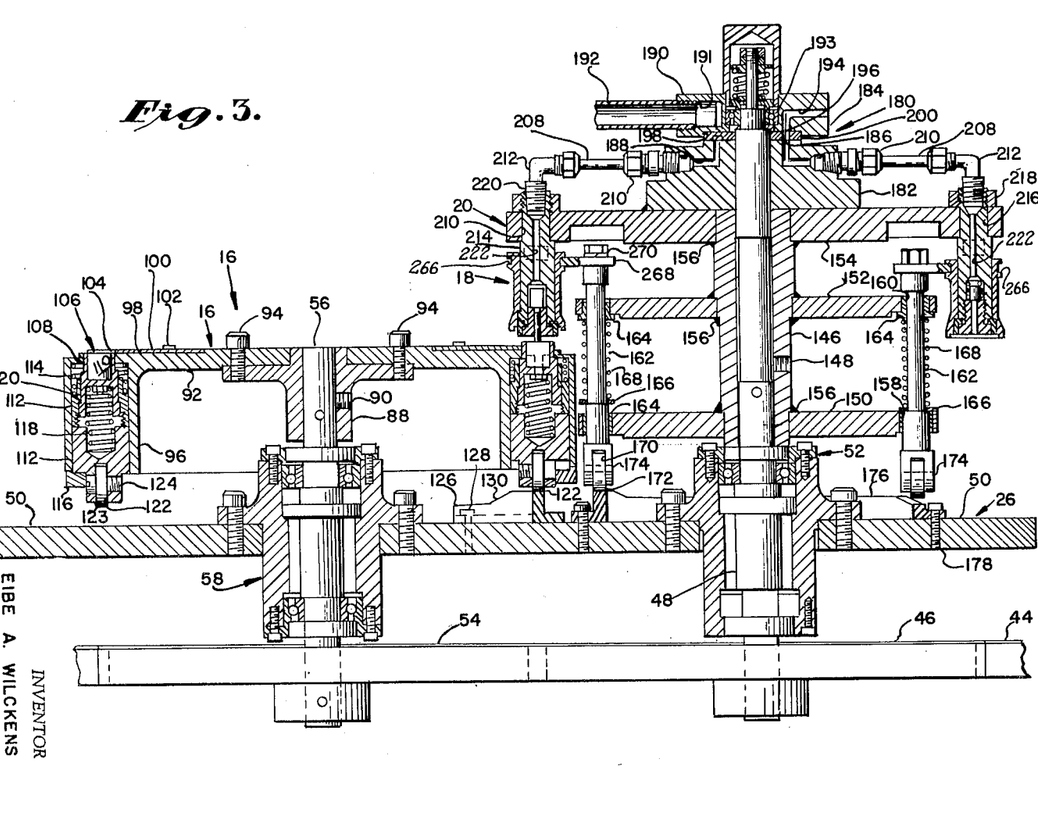
FIGURE 3 is an enlarged sectional view through the cap-receiving and transfer dial and rotary inspection structure of the present invention.

Referring to FIGURES 1, 2 and 3, the endless conveyor mechanism 12, the cap supporting and transfer dial 16 and the rotary inspection structure 20 must be driven in timed synchronism so that caps can be continuously fed through the machine, inspected and removed from the machine, at any of the reject stations or at the station where satisfactory caps are discharged. In order that the various units of the machine can be driven in synchronism, a suitable central source of power, such as an electric drive motor 24, is mounted on a frame structure 26, the frame structure 26 also being utilized as the supporting table 50 for the various units. Electric motor 24 is provided with a horizontal drive shaft 23 on which a drive pulley wheel 28 is mounted. A variable pitch belt pulley 30 passes over the pulley wheel 28 and a second pulley wheel 32 mounted on a horizontal input shaft 34 of a speed reducer member 36 carried by the frame 26. The drive motor 24 can be mounted on an adjustable base so that the belt pulley 30, which may be of the Reeves type, can be adjusted to vary the speed of the horizontal input shaft 34 of speed reducer member 36. The output shaft 38 of speed reducer 36 extends vertically of the same and is connected to one side of a flexible coupling 40. The upper half of flexible coupling 40 is connected to a vertical shaft 42 mounted in suitable bearings carried by the frame structure 26. A pinion gear 44, carried on shaft 42, meshes with a drive gear 46 carried on a vertical shaft 48 extending upwardly above the upper surface of table 50 of frame structure 26, as best shown in FIGURE 3. The shaft 48 is journaled in a suitable bearing housing, generally indicated at 52, in FIGURE 3. The portion of shaft 48 extending above the upper surface of table 50 of frame structure 26 carries and rotates the inspection turret 20 and its testing heads 18.

A drive gear 54, meshing with drive gear 46 on the opposite side from pinion gear 44, is carried on a vertical shaft 56, which is suitably mounted in a bearing housing, generally indicated at 58, the bearing housing being carried on the table 50 of frame structure 26. The shaft 56 which extends vertically about the surface of table 50, supports the transfer dial 16 for rotation and, as will be apparent from FIGURES 1 and 2, the dial 16 is horizontally disposed at an elevation below the testing heads 18 of rotary structure 20. By providing parallel spaced axes for the rotary structure 20 and the dial 16, the periphery of the rotary structure 20 carrying the testing heads 18, is approximately tangent to the portion of the dial 16 carrying the caps C for a travel of about 10° so as to facilitate the transfer of caps from the dial 16 to the testing heads 18. A more detailed description of this feature of the invention will appear later in the specification.

The endless conveyor mechanism 12 passes about idler sprockets 60, 62 and 64 which are suitably mounted on shafts carried in bearings on the frame structure 26. A drive sprocket 66 for endless conveyor mechanism 12 is driven by a worm gear 68 mounted on a vertical shaft 70 carried in suitable bearings in the frame structure 26. Mounted on the lower end of shaft 70 and meshing with drive gear 54 is a gear 72. As is now obvious, when the drive motor 24 provides power to the speed reducer 36, the shaft 42, carrying the pinion 44, is rotated. This in turn rotates the gears 46, 54 and 72 and, consequently, the rotary structure 20, transfer dial 16, and endless conveyor mechanism 12 are operated in timed sequence in the direction of the arrows A, B and C' respectively of FIGURE 1. While the drive motor 24 is disclosed as driving all of the elements of the machine in timed synchronism with one another, it will be apparent that in place of the motor 24 suitable drive connections may be made to other machines associated with the inspection machine of the present invention, such as the cap-assembling machine supplying caps to the cap inspection machine. If such a cap assembling machine is provided with a power take-off it is a common expedient to replace the motor and drive the units from such power take-off.

Endless conveyor mechanism

As best shown in FIGURES 1 and 2, the endless conveyor mechanism 12 is adapted to receive caps being supplied from presser dial 10, shown in phantom lines and which is tangent thereto at the point of transfer. The endless conveyor mechanism 12 includes an endless link chain belt or the like 74, which is adapted to extend about the drive sprocket 66 and idler sprockets 60, 62 and 64. Mounted on the endless link chain 74 in juxtaposition to one another are a plurality of cap-receiving platforms 76 having the recesses 14 which are provided with walls tapering inwardly from the presser dial 10, as shown at 78, for receiving and centering a cap thereon. As previously explained, the caps C are fed in an upside down position down the presser dial 10 and slide into the recesses 14 with their flanges or skirts facing outwardly so that the liners L are visible.

Each cap-receiving platform 76 is provided with a centrally positioned magnet 80 in its recess 14 and when the metallic shell S of the cap C slides into the recess, the cap is held tightly on the surface of the pocket or recess 14 of the cap-receiving element 76. The depth of the pockets or recesses 14 is such that when a cap C is positioned therein, the flared-out portion of the skirt or flange of the cap extends slightly above the platform 76. When the conveyor mechanism 12 is moving in the direction of the arrow C' in FIGURES 1 and 2, the caps are received from the presser dial 10 and then moved downwardly to the left and upwardly along the bottom reach of the conveyor mechanism without falling from the conveyor mechanism, as magnets 80 hold them in place. The caps C, as they approach the upper reach of the conveyor mechanism 12, engage a scraper blade 82 mounted on the frame structure 26, as indicated at 84 in FIGURE 1. The scraper blade 82 extends at an angle across the upper surface of the cap-receiving platforms 76 in close proximity thereto so that when the platforms pass therebeneath, the blade engages the portion of the periphery of the skirt of the cap which extends above the cap-receiving platform 76. As the conveyor mechanism 12 moves from the right to the left of FIGURE 1, the cap is gently and gradually urged transversely out of the recess 14 and into a pocket 86 in registry therewith and provided on the periphery of transfer dial 16.

Cap transfer and supporting dial

The cap transfer and supporting dial 16 is best shown in FIGURES 1 and 3 and, as previously explained, rotates in the direction of the arrow B. The dial 16 is provided with a hub 88 secured by means of a set screw 90 to the portion of vertical shaft 56 extending above the upper surface of base table 50 of frame structure 26. A disk element 92, bolted to the hub 88 by means of studs 94, is provided with a plurality of downwardly depending cylindrically-shaped members 96 circumferentially spaced about its periphery. The disk element 92 is further provided with an annular recess 98 in its upper surface in which an annular plate 100 fits flush and is bolted by studs 102. The plate 100 is provided with pockets 104 in its periphery for receiving caps from the conveyor mechanism 12. The pockets 104 are aligned in registry with the axes of the downwardly depending cylindrically-shaped members 96.

Members 96 provide guides or housings for the lift platforms, generally indicated at 106, upon which the caps are supported in the pockets 104. Lift platforms 106 are adapted to be reciprocated vertically with respect to the element 92 and the cap-receiving pockets 104 when the pockets approach a position beneath and are in registry with one of the testing heads 18 of rotary structure 20.

In more detail, the lift platforms 106 comprise lift plungers 108 having a flat cap-receiving surface. A centrally disposed magnet 110 is provided in each plunger 106 so that in effect it forms part of the flat cap-receiving surface and thereby retains a cap thereon. Each member 96 is provided with a lift plunger guide 112 which is urged downwardly against a stop 116 by a compression spring 114 inserted between guide 112 and the upper portion of member 96. Stop 116 is carried at the lower end of cylindrical member 96 and prevents the lift plunger guide 112 from dropping out of the member 96. A compression spring 118, weaker than spring 114 and positioned between the plunger 108 and the guide 112, urges the plunger 108 upwardly until a shoulder 120 on the plunger engages a corresponding shoulder on the lift plunger guide 112.

A roller 122, located in a slot 123 in the bottom of the lift plunger guide 112, is held in place by a screw 124 which serves as its spindle. The roller 122 acts as a cam follower for moving the lift plunger 108 and guide 112 and is adapted to engage a cam 126 mounted on the table 50 by studs 128. When the dial 16 is rotating, the roller 122 will engage a rise 130 on the cam 126 in an area when the platform 106 is approaching a position beneath and in registry with one of the testing heads 18 of the rotary structure 20. The rise 130 will cause the cam follower 122 to elevate the lift platform 106 against the spring action of spring 114 so that the plunger 108 is elevated to the position shown in FIGURE 6. This will elevate the cap C carried thereon into position for the initial test which is conducted by the testing head 18.

If the cap is so mutilated that the inside diameter of its shell S is smaller than predetermined limits, the testing head 18 will prevent further upward movement of the cap thereon and, consequently, the spring 118 provides for compensation in the elevation of the plunger 108. As will be explained in detail later in the specification, such a cap will not be picked off the plunger 108 by the testing head and thus, when the cam follower of the lift platform 106 is permitted to descend downwardly by the cam 126, the cap will be retained on the platform by the magnet 110 until such time that it is ejected therefrom into a reject bin.

As clearly shown in FIGURE 1 and previously described above, caps C are transferred out of the recesses or pockets 14 or conveyor mechanism 12 into the pockets 86 of transfer dial 16. In order that the caps C may be properly centered on the magnets 110 of the lift plungers 108, a spring finger 132 carried on the frame structure 26, as indicated at 84, and extending across the path of the plungers, will engage the skirt of the cap and urge it inwardly to a position where it is accurately centered on the magnet 110 and respective plunger 108 of the lift platform 106. As the dial 16 rotates in the direction of the arrow B, the caps are gradually elevated into position for testing by the testing heads 18 of turret 20. Certain caps C and shells S of caps will not be picked off of the plungers 108 by the testing heads 18 because of certain functional defects as mentioned above. These caps C and shells S remain on the plungers 108 as the plungers are lowered and a scraper finger 134, mounted on the table top 50 of frame structure 26 by the screws 136, will gently push the cap or shell, as the case may be, off of the platform and dial into a chute 138 (FIGURES 1 and 2), the caps sliding down the chute to a reject bin, generally indicated at 140. The chute 138 is arcuate-shaped and extends from beneath the transfer dial concentric with the axis of the turret 20 to a position immediately adjacent the discharge for good caps from the turret. The bottom walls 142 and 144 slope toward the catch pan 140, as best shown in FIGURE 2. By providing one arcuate-shaped chute having the sloping walls 142 and 144, rejected caps at two different stations may be received in the same reject pan 140.

Rotary inspection structure or turret

Referring now to FIGURES 1 and 3, it will be noted that the rotary inspection structure or turret 20 is carried on the portion of the vertical shaft 48 extending above the table 50 of frame structure 26. As previously mentioned, rotation of the shaft 48 by rotation of the drive gear 46 will cause the turret 20 to rotate in timed sequence with the transfer dial 16 so that the testing heads 18 will be successively brought into registry with the platforms 106 carried by the dial 16. Once one of the testing heads 18 is in registry with one of the platforms 106, a sequence of tests, to be described in detail, is performed on the cap C carried by the particular platform. The cap C may either be rejected while it is still on the platform, if it has certain functional defects, or it may be picked off by the testing head 18 and carried therewith as the turret 20 rotates, for additional inspections where other functional defects in the construction and assembly of the cap are determined, or it is determined that the cap meets satisfactory standards.

At this time, it should be pointed out that the axis of rotation of turret 20 is parallel to and spaced from the axis of rotation of dial 16. By carefully arranging the distance between the two axes in accordance with the radial position of the platforms 106 on dial 16 and testing heads 18 on turret 20, the center line of the path of travel of the platforms 106 and the center line of the path of travel of the testing heads 18 are arranged to overlap slightly, so that in effect, a platform 106 is in substantial registry with a testing head 18 for approximately 10° of travel. This permits preliminary tests to be conducted on the cap by the testing head 18 while the cap is still supported on the plunger 108 of a platform 106.

The rotary turret 20 includes an elongated hub 146 fixed to the shaft 48 for rotation therewith, by a set screw 148 and a tapered pin (not shown). The hub is provided with a lower annular flange 150, an intermediate annular flange 152 of approximately the same diameter, and an upper annular flange 154 of greater diameter than flanges 150 and 152. The flanges 150, 152 and 154 are fixed to the hub in any suitable manner, such as by welding, as indicated at 156. Flange 150 is provided with a plurality of apertures 158 spaced about its periphery, the apertures 158 numbering the same as the testing heads 18 carried by the upper flange 154. Intermediate flange 152, which is spaced upwardly from flange 150, is likewise provided with a plurality of spaced apertures 160 about its periphery, the apertures 160 being in vertical alignment with the apertures 158. The apertures 158 and 160 are provided with bushings 164, and vertical rods 162 extend through a pair of aligned apertures and are provided for actuating elements of the testing heads 18 in a manner to be described.

As best shown in FIGURE 3, each rod 162 is provided with a ring element 166 at its lower end but positioned above plate 150, and a compression spring 168 is provided on the rod between the ring element 166 and intermediate flange 152 to normally urge the rod downwardly until the ring element 166 abuts against the lower flange 150. The lower end of the rod 162, extending below flange 150, is provided with a slot 170 in which a wheel 172 is held by a screw 174 that acts as a spindle therefor. The wheel 172 rides on a cam 176 which is bolted to the table top by the studs 178. The cam 176 causes the wheel 172 and its respective rod to be elevated when there is a rise in the cam, whereas the spring 168 will cause the rod to be lowered when there is a depression in the cam. As will follow later in the specification, a detailed explanation of the arrangement between the rods 162 and the testing heads 18 will be given.

Mounted on the upper flange 154 is a distributor valve, generally designated at 180. The distributor valve 180 includes a member 182 rotatable with the turret 20 and a stationary member 184 which also provides a housing for a bearing 193 supporting the upper end of shaft 48.

The rotatable member 182 is provided with a plurality of ports 186 on its horizontal surface, each port being provided for a passageway 188 leading to and communicating with an individual testing head 18.

The stationary member 184 of the distributor valve is provided with an inlet fitting 190 to which is attached a pipe 192 extending from a source of vacuum (not shown). In addition, the stationary member 184 is provided with a passageway 194 extending from atmosphere through the member and terminating in a port 196. Stationary member 184 is provided with an annular recess 198 in its lower horizontal surface in which a disk-shaped element 200 is carried.

The disk-shaped element 200 is best shown in FIGURES 4 and 5 and provides a means for distributing vacuum from the source of vacuum, to the testing heads 18, for a desired period of time. In more detail, the disk-shaped distributor element 200 is provided with an arcuate groove 202 on its undersurface and passageways or ports 204 communicating with the passageway 191 (FIGURE 3) in fitting 190. In addition, the distributor element 200 is provided with a passageway 206 communicating with the port 196 (FIGURE 3) in the member 184.

Extending from each passageway 188 (FIGURE 3) in the member 182 is a conduit 208. The conduit 208 connects to a fitting 210 in the member 182 and an elbow 212 carried on the upper flange 154. Each testing head 18 includes an elongated body member 214 extending through an aperture 216 provided in the flange 154. The end of body 214 is threaded and a nut 218 holds the testing head 18 in place on the flange 154, as shown in FIGURE 3. One end of the elbow 212 is threaded into the testing head, as indicated at 220.

Body member 214 is provided with a passageway 222 which extends vertically thereof and communicates with the elbow 212. The lower end of passageway 222 is enlarged, as shown at 224 in FIGURE 6, and is threaded, as indicated at 226, in order that it may receive a threaded fitting 228. The threaded fitting 228 is adapted to clamp an annular sleeve element 230 in place on the lower end of the body member 214. It will be noted that the sleeve element 230 is provided with a substantially beveled end 232 for engagement with a liner L of a cap C being tested and has a diameter at the beveled end 232 substantially equal to the lip of a container on which the cap is to be applied. In addition, the outside diameter of the sleeve element 230 is accurately controlled to provide for gauging of the inside diameter of the shell S of a cap being tested.

As best shown in FIGURE 6, fitting 228 is provided with an axially extending hole 234 therethrough, and a valve stem 236 of a vacuum valve 238 is adapted to slide therein. The valve 238 is provided with an enlarged head 240 having a seating surface 242 adapted to engage the horizontal end surface or valve seat 244 of fitting 228 to thereby provide a seal. As clearly shown in FIGURE 6, the valve stem 236 is provided with an axially extending hole 246 open at its lower end and closed at its upper end. Radially extending ports 248 at its upper end communicate with hole 246 and are adapted to be uncovered when the valve stem is raised vertically, as shown in FIGURE 6. This permits vacuum in the passageway 222 to be applied through the valve stem to a cap being tested. In order that the vacuum can be applied over a greater area of the cap, horizontal ports 250 are provided in the lower end of the valve stem and communicate with hole 246. These ports are capable of remaining open when the valve stem is moved upwardly, by the provision of an annular recess 252 in the bottom of fitting 228.

Valve 238 is normally held closed by a compression spring 254 positioned between the head 240 of the valve and a shoulder 256 in passageway 222. The valve 238 is open when a cap is brought into engagement with the testing head 18 and the liner L of the cap engages the lower end of the valve to raise it off its seat 244 against the pressure of spring 254.

Figure 8:
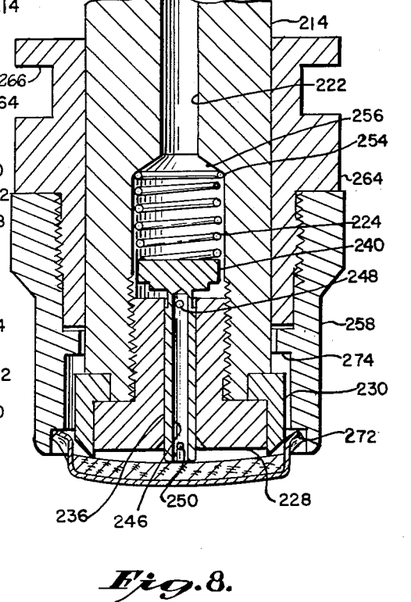
FIGURE 8 is a fragmentary view similar to FIGURE 6, the cap-supporting platform having been lowered away from the cap and the cap being supported on the testing head while the testing head gauges the outside diameter of the cap.

Carried on the outside of the body member 214 is a sleeve element 258 which is adapted to gauge the outside diameter of a cap, as shown in FIGURE 8. In more detail, the sleeve element 258 is provided with internal threads 260 (FIGURE 6) which are received on the threaded end 262 of a collar 264. The collar 264 is slidable on the body member 214 and is provided with an annular groove 266 at its upper end.

As illustrated in FIGURE 3, a member 268, carried on the upper end of the rod 162 by means of the nut 270, is provided with a forked end adapted to be received in the groove 266. By this arrangement, the collar 264 is reciprocated on the body 214 when certain tests are being performed on a cap being tested. In other words, rotation of the turret causes the cam follower 172 traveling on the cam 176 to reciprocate the rod 162, and thus the sleeve 258 to perform a desired test.

Figure 9:
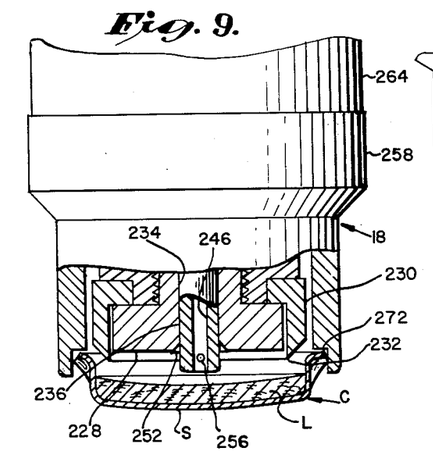
FIGURE 9 is a view similar to FIGURE 8 but shows the testing head ejecting a good cap therefrom after the outside diameter of the shell has been gauged and other tests on the cap have been made.

In more detail, the sleeve element 258 is provided with an internal diameter adjacent its lower edge equal to the maximum outside diameter permitted for a shell S of a cap C being tested. An internal shoulder 272 is adapted to engage the flange of the shell, if the cap has the proper outside diameter, as shown in FIGURE 9, and thus continued downward movement of the sleeve element 258 will strip a good cap from the testing head 18. On the other hand, if the cap being tested has an outside diameter which is too large, the lower end of sleeve 258 will engage the skirt of the cap and strip the same from the testing head 18 prior to the testing head moving to the position where good caps are stripped therefrom. The downward movement of the sleeve 258 is limited by the internal shoulder 274 (FIGURE 8) engaging the end of the sleeve element 230 which is fixed to the body member 214 by the fitting 228.

Referring again to FIGURE 1 and FIGURE 2, a rotating magnetic dial 276 is mounted on the upper end of shaft 42 immediately below the testing heads 18 at a position where good caps are to be stripped, one by one, from the testing heads 18 as they pass over the same. The magnetic dial 276 rotates in the direction of the arrow D in FIGURE 1, and caps falling thereon are conveyed to a point where they are picked off and stripped therefrom by a finger 278 provided on discharge chute 22. The finger 278 extends immediately over the dial in close proximity to the surface thereof and in the path of caps traveling on the dial, and thus the caps are stripped from the dial and fall down the inclined chute 22 where they are counted and packaged in cartons. As shown in the phantom lines of FIGURE 1, the chute 22, with its finger 278, may be shifted or pivoted on a vertical axis so that its discharge end can be positioned into a different carton or container. The previously mentioned Wilckens and Stoll patent discloses such an arrangement, where the chute is changed from one position to another position by a counter determining the number of crown-type caps traveling thereon so as to successively fill cartons with a predetermined number of caps.

As shown in FIGURE 1, a second chute 280 extending from one side of the dial 276 to a point beneath a stripper blade 282 is provided for receiving mutilated caps and liners still present on the testing heads 18 after the heads have passed the station where good caps are discharged. The chute 280 is provided with sloping bottom walls similar to those of chute 138 which lead into a reject box 284. The stripper blade 282 is a bifurcated element having the curved tines 286 and 288 spaced apart a distance sufficient to permit the lower end of the testing head to travel therebetween but narrow enough to strip a cap downwardly from the testing head when the flanges of the cap engage the same. The stripper blade 282 is mounted on the table 50 of frame structure 26, as indicated at 290, and insures that the testing heads are clear of caps or liners before they are transferred to a position over a platform on dial 16 where they pick up another cap to be tested.

Operation

The operation of the cap inspection machine heretofore described is as follows: Caps C to be tested are continuously fed from a suitable source, such as from a cap applying machine or the like, directly into the recesses on the platforms 76 of endless conveyor mechanism 12, in one by one relationship, and transferred to the cap transfer and supporting dial 16. It is of course understood that the caps C must be oriented before they enter chute 10 so that they are all facing the same direction. In other words, they must be fed directly from a cap-assembling machine to presser dial 10 in the same manner that they are delivered therefrom. On the other hand, orienting means well known in the art must be used to insure proper positioning of the caps on presser dial 10, if the caps are taken at random from the hopper. Magnets 80 on the platforms 76 of endless conveyor mechanism 12 hold the caps, which are presented thereto in upside down position, as the endless conveyor mechanism moves in the direction of the arrow C' in FIGURE 2. When the caps on the platforms 76 approach the upper horizontal run of the conveyor mechanism 12, they are stripped off of the platforms by engagement with the srtipper blade 82 and are positioned in pockets 86 on the dial 16. It might be mentioned that since the dial 16 and the conveyor mechanism 12 are operating in synchronism with one another, a pocket 86 of the dial will be in registry with a recess 14 of a platform 76, when the cap is being stripped from the platform to the recess 86 of the dial.

The transfer dial 16, which is rotating in the direction of the arrow B in FIGURE 1, conveys the caps C past the spring finger 132, the finger engaging the caps and making sure that the cap is properly centered on the magnet 110 in plungers 108 of the dial 16. Continued rotation of the dial 16 will cause the cam followers 122 of the platforms 106 to ride up the incline 130 of cam 126. This causes the platforms to elevate as they are coming into a position of registry with one of the testing heads 18 on the rotary turret 20. When one of the platforms 106 is directly under one of the testing heads 18, the platform is fully elevated, as shown in FIGURE 6. When the platform is in its fully elevated position and, assuming the cap has the proper inside diameter and is provided with a liner L, the valve stem 236 will be engaged by the liner of the cap and will elevate the valve 238 off of its seat so that vacuum can be applied to the liner to determine if the liner has a proper sealing surface. This occurs at the instant when the platform 106 and the testing head 18 is in registry. Before further description of the test it must be explained that the testing head under consideration has vacuum applied through the duct 222, as the passageway 188 in the rotating member 182 is in communication with the arcuate groove 202 in the stationary member 184. As long as the passageway 188 is in communication with the groove 202 vacuum is being applied to the testing head but it is only applied to the cap when the valve 238 is open, as shown in FIGURE 6.

Assuming the valve 238 has been opened and that the sleeve 230 has gauged the inside diameter of the cap as satisfactory, the lower edge 232 of the sleeve engages a liner at approximately the position where a container's lip will engage the liner. The vacuum, which is greater than the magnetic force of magnet 110, will cause the cap to stick to the testing head if the liner has a satisfactory sealing surface, but if there is a leak in the liner, then when the platform 106 is lowered, the magnet 110 on the plunger 108 is of sufficient strength to pull the cap and the liner downwardly off of the testing head. Should the cap and liner remain with the platform 106 on the dial 16, then the cap is stripped therefrom into the chute 138 and reject box 140. While a cap is at the position shown in FIGURE 6, which is when the testing head is in registry with a platform 106 therebelow, the sleeve 230 will gauge the inside diameter of the shell and if it is too small, the flanges of the cap will not be able to pass over the outside diameter of the sleeve 230 and will hold the cap in such a position that the lower end of the valve stem 236 will not engage the liner of the cap. When such a condition occurs, the compensating spring 118 does not permit the platform 106 to be elevated to its maximum height. A cap having an improper inside diameter will thus be retained on the platform 106 by the magnet and subsequently stripped therefrom, as explained above.

Another condition which can occur when the testing head 18 and a platform 106 of dial 16, are in the position shown in FIGURE 6, is the determination of whether or not a liner L is present in the cap. If the shell S of a cap does not have a liner, the shell will be raised to its normal elevated position, but because there is no liner present, the valve 238 will not be opened and thus, the shell will be lowered off of the testing head when the platform 106 is lowered. This shell, without a liner, is subsequently ejected from the platform, as described above.

Figure 7:
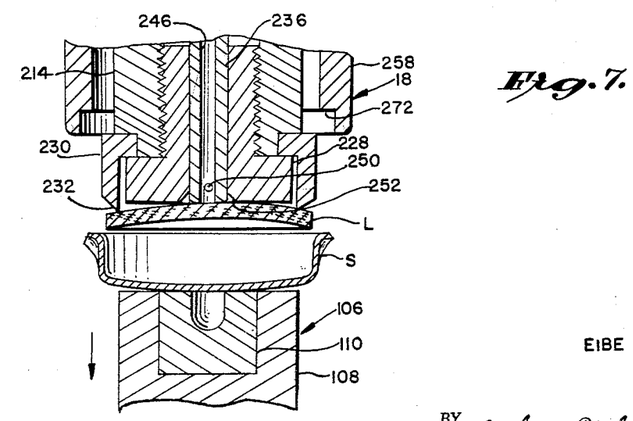
FIGURE 7 is a fragmentary view similar to FIGURE 6, but showing the cap-supporting platform being lowered and showing the shell of a cap having a loosely fitting disk, not adhered to the shell, being rejected.
Figure 11:
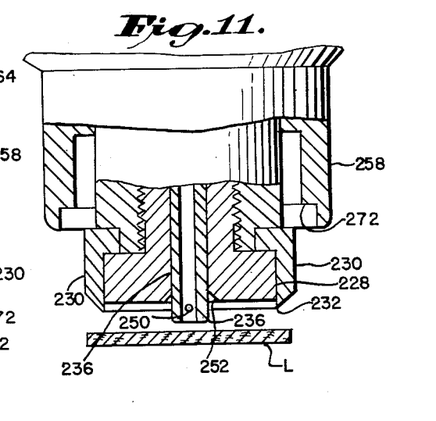
FIGURE 11 is a view disclosing the release of a cork liner which was loosely fitting in the shell and the shell had been previously rejected when the cap-supporting platform was lowered, as shown in FIGURE 7.

In FIGURE 7, the testing head 18 and the platform 106 are moving out of registry with each other in the direction of the arrows B and A respectively, in FIGURE 1. The purpose of FIGURE 7 is to show what would happen if the shell of the cap is provided with a liner that is loosely fitting in the shell across its diameter and is not adhered to the shell in the usual manner. The cap, with the loosely fitting liner L has been raised up to the position shown in FIGURE 6, and of course, assuming it has the proper inside diameter, the vacuum valve 238 is open so that vacuum is applied through the valve stem 236 to the cap. However, when the platform 106 begins to lower, the vacuum in the valve stem 236 is sufficient to hold the liner on the testing head but the magnet 110 separates the shell S from the liner L. The shell S is stripped off of the platform 106 and into the reject bin 140, in the manner previously described, but the liner L continues with the testing head to a position where the vacuum in the testing head is positively vented to atmosphere, as shown in FIGURE 11. A more detailed description of this condition will appear later in the specification.

Referring now to FIGURE 8, the testing head with a cap, has been transferred by the rotary turret 20 to a position where the cam follower travels down an incline and causes the sleeve 258 to be lowered a predetermined distance. The sleeve 258 is provided with an internal diameter equal to what the outside diameter of the cap should be. If the cap has a larger outside diameter, the sleeve cannot pass over the cap as shown in FIGURE 8, but will hit the edge of the flange and will strip the cap from the testing head. The cap will fall directly into the chute 138 and slide down the sloping bottom wall 144 to the reject bin 140. On the other hand, if the cap has a satisfactory outside diameter, the sleeve merely comes down to a position where it surrounds the flange of the shell, as shown in FIGURE 8. In the meantime, the testing head 18 is being continuously moved by the rotating turret 20 to a position where it is above the good cap discharge dial 276. The cam follower 172 for the particular testing head will continue to descend on the cam 176, thereby causing the sleeve element 258 to descend further to the position shown in FIGURE 9, where the cap is positively broken away from the end 232 of the sleeve element 230, thus breaking the vacuum and thus permitting the cap to fall, by gravity, onto the dial 276 where it is transferred down the chute 22 and is packaged in a carton.

Figure 10:
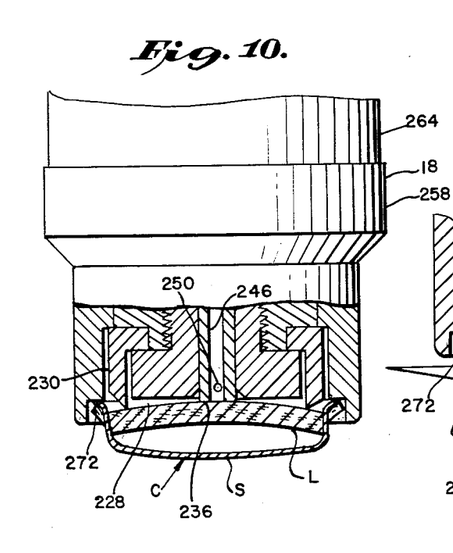
FIGURE 10 is similar to FIGURE 9 but shows the position of the cap parts when the liner is not properly adhered to the shell of the cap but fits the shell tightly.

While at the station shown in FIGURE 9 where the cap, if it is good, is stripped from the testing head 18, the liner of the cap is checked for proper adherence to the shell of the cap. Referring now to FIGURE 10, the testing head 18 is shown in the same position as in FIGURE 9 but it will be noted that the liner L has pulled up from the shell S. Since the liner has not moved downwardly with the shell S, the valve 238 cannot close and vacuum is still applied to the liner. The liner has sufficient diameter to tightly engage the shell, as this condition was previously tested when the cap first came under the influence of the testing head. Consequently, the shell does not fall from the testing head onto the dial 276 for good caps but remains with the testing head. The shell and liner L of FIGURE 10 are carried by the testing head past the dial 276 to a position where the passageway 188, in the stationary member 182 of the distributor valve 180, is out of communication with the groove 202, but then comes into communication with the port 206 leading to atmosphere. This will break the vacuum in the head to permit the cap, with the faulty liner, to fall therefrom into the chute 280 and reject bin 284. If, for any reason, the cap with the faulty liner does not drop from the testing head when the vacuum is broken, the cap will be stripped positively from the testing head, as indicated in FIGURE 12, by coming into contact with the stripper blades 282.

FIGURE 11 represents the position of the testing head when it has had the vacuum broken by venting to atmosphere. As previously mentioned, loose liners are carried by the testing head through the various testing procedures and are not released therefrom until the testing head has traveled to a position where the vacuum can be positively broken. When the vacuum is positively broken by venting to atmosphere, the spring 254, acting on the valve 238, will cause the valve to close and the liner L will drop into the chute 280 and reject bin 284. If, for some reason, a liner is stuck to the testing head 18, even after the vacuum has been released, it too will be positively stripped from the testing head by the stripper blade 282, as indicated in FIGURE 12.

While the inspection machine of the present invention has been described for inspecting caps of the crown type, for application to bottles, cans or the like, it is of course within the scope of the present invention to inspect any type of metallic cap containing a shell having a depending skirt and a liner therein. The cap may be of the screw thread type, lug type, side seal type, or the like.

Having set forth the nature, objects and advantages of the present invention, it will now be perceived and obvious, that the invention is susceptible to some changes, adjustment and modifications, without departing from the principle and spirit thereof. For this reason, the terminology used in the specification is for the purpose of description and not of limitation, the scope of the invention being indicated in the claims.

I claim:

1. In an apparatus for the quality inspection of caps of the type having a shell with a depending skirt and a liner therein: a frame structure; means carried by said frame structure for receiving and supporting a cap to be tested; a testing head coacting with said cap supporting means, said testing head including a sleeve element having an outside diameter substantially equal to the inside diameter of a cap being tested for gauging the inside diameter of the cap, said sleeve element also having an annular liner engaging surface of less diameter than its outside diameter and capable of providing a seal with a perfect liner, valve means cooperating with said sleeve element to apply a vacuum to said cap and remove the same from said supporting means when the liner has a perfect sealing surface and is tightly fitting within the shell of the cap, a second sleeve element carried by said testing head and movable with respect to said first sleeve for gauging the outside diameter of the cap when the cap is supported by vacuum from said valve means, said second sleeve element ejecting a cap from said valve means when the cap has a diameter greater than a predetermined diameter; means cooperating with said cap supporting means and said testing head for receiving caps lacking liners from said supporting means and caps ejected by said second sleeve; means on said second sleeve to positively eject perfect caps from said testing head; and means to receive the perfect caps.

2. An apparatus of the character described in claim 1, wherein said valve means includes a valve carried by said testing head and operable by engagement of a liner with a cap being tested to permit vacuum to be applied thereto.

3. An apparatus of the character described in claim 1, wherein said valve means includes a valve carried by said testing head and operable to open position by engagement with the liner of a cap, said valve being operable to closed position when the source of vacuum is released.

4. An apparatus of the character described in claim 1, wherein said cap-supporting means includes a platform movable vertically toward said testing head whereby the liner of a cap to be tested engages said first-mentioned sleeve.

5. An apparatus of the character described in claim 4, wherein said platform is provided with a magnet for retaining the cap thereon at least until the cap engages said testing head.

6. An apparatus of the character described in claim 1 wherein said cap supporting means includes a platform movable toward said testing head, spring means normally urging said platform toward said testing head and providing compensation for elevation of said platform when the shell of the cap being tested has an improper outside and inside diameter.

7. In an apparatus for quality inspection of caps of the type having a shell with a depending skirt and a liner therein: a frame structure; a rotatably mounted cap transfer dial carried by said frame structure and having a plurality of pockets in its periphery for receiving caps to be tested, said transfer dial including a resiliently mounted lift platform associated with each pocket and having spring means for normally urging the same upwardly; means to elevate said platforms when said dial is rotating; a rotary structure mounted on said frame structure, said rotary structure including a plurality of testing heads carried therewith and adapted to be positioned above the platforms during their travel for testing caps carried thereby, each testing head including a sleeve element having a predetermined outside diameter for gauging the inside diameter of a cap being tested, said sleeve element also having an annular downwardly facing surface of less diameter than its outside diameter for engagement with the liner of a cap and valve means cooperating with said annular downwardly facing surface of said sleeve element for applying a vacuum to test the presence of a liner and the sealing surface of the same, said valve means when applying a vacuum causing a cap being tested to be transferred from the platform when a liner is present in the cap and the liner has the proper sealing surface as well as being tighlty secured in the cap; means on said testing head for gauging the outside diameter of the cap after the cap has been transferred to the testing head, said gauging means ejecting a cap having too large an outside diameter from said testing head; means to receive an ejected cap; means to eject a perfect cap from said testing head; and means to receive a perfect cap.

8. An apparatus of the character described in claim 7, wherein said means to gauge the outside diameter of a cap being tested includes a sleeve element mounted on said testing head and movable with respect to said first sleeve element, and means to move said second sleeve element.

9. An apparatus of the character described in claim 8, wherein said second sleeve element is provided with an internal shoulder for ejecting perfect caps after the outside diameter of the cap being tested has been gauged.

10. An apparatus of the character described in claim 7, wherein each platform is provided with a magnet to retain a cap to be tested thereon at least until the cap is received by said testing head.

11. An apparatus of the character described in claim 7, wherein said means to elevate said platform includes a cam.

12. In combination, a frame structure, a horizontally disposed cap-receiving and transfer dial rotatable about a vertical axis and carried on said frame structure, said dial including cap-receiving pockets spaced about its periphery and a cap-supporting platform associated with each pocket for receiving caps to be inspected of the type having a shell with a depending skirt and a liner therein, said cap-supporting platforms being reciprocal vertically with respect to said dial, means to reciprocate the said platforms vertically, a rotary structure mounted on said frame structure and rotatable in a horizontal plane on a vertical axis spaced from the vertical axis of said dial, said rotary structure including a plurality of testing heads carried therewith and adapted to be positioned above the platforms of said dial during a portion of their travel, said means to reciprocate platforms being adapted to raise said platforms whereby a cap carried thereon is in engagement with one of the testing heads when the platform is beneath a testing head, and means on said testing head for testing presence of a liner in a cap and the sealing surface of the liner, and means on each of said testing heads for gauging the inside and outside diameter of a cap.

13. A combination of the character described in claim 12, including a magnet on each of said platforms to retain a cap to be tested thereon at least until engaged by said testing head.

14. A combination of the character described in claim 12, wherein said means on said testing heads for testing the liner of a cap includes a sleeve element engageable with the liner of a cap, and vacuum means being applied centrally of said sleeve element, said vacuum means being sufficient to remove a cap from said platform when a cap is provided with a liner and the liner is tightly fitting within the shell and has a satisfactory sealing surface.

15. A combination of the character described in claim 12, wherein said means to gauge the inside diameter of a cap causes said cap to be ejected from said testing head and wherein said platform is provided with compensating means to compensate for its elevation with a cap having too small an inside diameter.

16. A combination of the character described in claim 15, wherein said compensating means includes a spring provided between said platform and said means to reciprocate said platform.

17. In combination, a frame structure, a horizontally disposed cap-receiving and transfer dial rotatable about a vertical axis and carried on said frame structure, said dial including cap-receiving pockets spaced about its periphery and a cap-supporting platform associated with each pocket for receiving caps to be inspected of the type having a shell with a depending skirt and a liner, said platforms being reciprocal vertically with respect to said dial, means to reciprocate the platforms vertically, a rotary structure mounted on said frame structure and rotatable in a horizontal plane on a vertical axis spaced from the vertical axis of said dial, said rotary structure including a plurality of testing heads carried therewith and adapted to be positioned above the platforms of said dial during a portion of their travel and when the platforms are elevated to a position whereby a cap carried thereon is in engagement with the testing head, a source of vacuum, a distributor valve for distributing vacuum from said source to each of said testing heads, each of said testing heads having a sleeve element for engaging the liner of a cap being tested and a valve operable by engagement with the liner for applying vacuum from said source to test the cap for presence of and proper sealing surface on a liner, means to eject satisfactory caps from said testing heads and means to vent said testing heads to atmosphere after said last-mentioned means is operated to eject satisfactory caps.

18. A combination of the character described in claim 17, wherein said valve in each of said testing heads is provided with spring means to close the same.

19. A combination of the character described in claim 17, wherein each of said testing heads includes means to gauge the outside diameter of a cap after the cap has been tested for presence of a liner and proper sealing surface on a liner, said gauging means ejecting caps from said testing head having too large an outside diameter.

20. A combination of the character described in claim 19, wherein said gauging means includes a sleeve element mounted on each of said testing heads and reciprocal vertically with respect thereto, said sleeve elements having a predetermined inside diameter.

21. A combination of the character described in claim 20, wherein means are provided for reciprocating said sleeve elements, said means including a cam mounted on said frame structure and a cam follower carried by each of said sleeve elements.

22. In combination, a frame structure, a horizontally disposed cap-receiving and transfer dial rotatable about a vertical axis and carried on said frame structure, said dial including cap-receiving pockets spaced about its periphery and a cap-supporting platform associated with each pocket of said dial and reciprocal vertically with respect thereto, a rotary structure mounted on said frame structure and rotatable in a horizontal plane on a vertical axis spaced from the vertical axis of said dial, said rotary structure including a plurality of testing heads carried therewith and adapted to be positioned above the platforms of said dial during a portion of their travel and when said platforms have been elevated to a position where a cap thereon is in engagement with the testing head, means to determine presence of a liner in and inside diameter of a cap while the cap is supported on the platform, said last-mentioned means being adapted to remove the cap from the platform and support the same on the testing head when the cap is provided with a tightly fitting liner and has the proper inside diameter, means to strip caps from said platforms when said testing heads fail to pick up caps, means on each testing head operable after the cap has been removed from a platform by the testing head for gauging the outside diameter of a cap and rejecting the cap if the outside diameter is too large, means operable after the outside diameter has been gauged for removing satisfactory caps from said testing head, and means for removing any liners and caps remaining on said testing heads after said means for removing satisfactory caps has been operated.

23. A combination of the character described in claim 22, wherein said last-mentioned means includes a stripper blade mounted in the path of movement of caps and liners carried by the testing heads.

24. A combination of the character described in claim 22, including means to receive satisfactory caps, said means including a horizontally disposed rotatable disk mounted below said testing heads when said means on said testing heads are actuated to remove satisfactory caps, said rotating disks including magnetic means to retain caps, and a chute element for stripping caps off of said rotating disk.

25. A combination of the character described in claim 22, including means to receive rejected caps stripped from said platforms by said stripping means and rejected caps stripped from said testing heads by said gauging means.

26. A combination of the character described in claim 25, including means to receive caps and liners stripped from said testing heads by said stripper blades.

References Cited in the file of this patent

UNITED STATES PATENTS

| | | |
|---|---|---|
| 1,960,151 | Gray | May 22, 1934 |
| 2,352,091 | Fedorchak | June 20, 1944 |
| 2,924,093 | Hurst | Feb. 9, 1960 |